(12) United States Patent
Yamawaki

(10) Patent No.: US 7,149,171 B2
(45) Date of Patent: Dec. 12, 2006

(54) APPARATUS FOR WRITING DATA AND METHOD FOR GENERATING DVD FORMAT DATA

(75) Inventor: Masashi Yamawaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 10/263,200

(22) Filed: Oct. 3, 2002

(65) Prior Publication Data

US 2003/0161239 A1 Aug. 28, 2003

(30) Foreign Application Priority Data

Feb. 22, 2002 (JP) ............................. 2002-046591

(51) Int. Cl.
 *G11B 7/0045* (2006.01)
 *G11B 5/09* (2006.01)
(52) U.S. Cl. ................................. 369/59.25; 369/59.26
(58) Field of Classification Search ............. 369/47.22, 369/47.15, 47.1, 47.16, 59.25, 59.26, 53.35
See application file for complete search history.

(56) References Cited

U.S. PATENT DOCUMENTS

| 6,119,201 A * | 9/2000 | Kulakowski et al. ....... 711/112 |
| 6,191,712 B1 * | 2/2001 | Still ............................. 341/95 |
| 6,809,894 B1 * | 10/2004 | Bliss et al. ................... 360/48 |
| 2003/0161239 A1 * | 8/2003 | Yamawaki ............... 369/59.25 |

FOREIGN PATENT DOCUMENTS

JP 01217729 A * 8/1989

* cited by examiner

*Primary Examiner*—William J Klimowicz
(74) *Attorney, Agent, or Firm*—Staas & Halsey LLP

(57) ABSTRACT

An apparatus for writing block data, which includes a plurality of sectors, to a recording medium. The apparatus includes a controller for generating the block data and writing the block data to the recording medium. The controller performs a padding process on final block data when the final block data is written to the recording medium. The controller includes a padding processing unit for generating padding process data. The generation of the padding process data with the controller reduces the load of a processing unit that controls the controller.

16 Claims, 20 Drawing Sheets

Fig.12

| Sector Value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 0 | 0 | 0 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 0 | 0 | 0 | 0 | 0 | 0 | 0 |
| 3 | 0 | 0 | 0 | 1 | 0 | 0 | 0 | 0 | 0 | 0 | 0 | 0 | 0 | 0 | 0 | 0 |
| 4 | 0 | 0 | 0 | 0 | 1 | 0 | 0 | 0 | 0 | 0 | 0 | 0 | 0 | 0 | 0 | 0 |
| 5 | 0 | 0 | 0 | 0 | 0 | 1 | 0 | 0 | 0 | 0 | 0 | 0 | 0 | 0 | 0 | 0 |
| 6 | 0 | 0 | 0 | 0 | 0 | 0 | 1 | 0 | 0 | 0 | 0 | 0 | 0 | 0 | 0 | 0 |
| 7 | 0 | 0 | 0 | 0 | 0 | 0 | 0 | 1 | 0 | 0 | 0 | 0 | 0 | 0 | 0 | 0 |
| 8 | 0 | 0 | 0 | 0 | 0 | 0 | 0 | 0 | 1 | 0 | 0 | 0 | 0 | 0 | 0 | 0 |
| 9 | 0 | 0 | 0 | 0 | 0 | 0 | 0 | 0 | 0 | 1 | 0 | 0 | 0 | 0 | 0 | 0 |
| A | 0 | 0 | 0 | 0 | 0 | 0 | 0 | 0 | 0 | 0 | 1 | 0 | 0 | 0 | 0 | 0 |
| B | 0 | 0 | 0 | 0 | 0 | 0 | 0 | 0 | 0 | 0 | 0 | 1 | 0 | 0 | 0 | 0 |
| C | 0 | 0 | 0 | 0 | 0 | 0 | 0 | 0 | 0 | 0 | 0 | 0 | 1 | 0 | 0 | 0 |
| D | 0 | 0 | 0 | 0 | 0 | 0 | 0 | 0 | 0 | 0 | 0 | 0 | 0 | 1 | 0 | 0 |
| E | 0 | 0 | 0 | 0 | 0 | 0 | 0 | 0 | 0 | 0 | 0 | 0 | 0 | 0 | 1 | 0 |
| F | 0 | 0 | 0 | 0 | 0 | 0 | 0 | 0 | 0 | 0 | 0 | 0 | 0 | 0 | 0 | 1 |

Fig.16

| PD Value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 1 | 1 | 0 |   |   |   |   |   |   |   |   |   |   |   |   |   |
| 2 |   | 1 | 1 | 0 |   |   |   |   |   |   |   |   |   |   |   |   |
| 3 |   |   | 1 | 1 | 0 |   |   |   |   |   |   |   |   |   |   |   |
| 4 |   |   |   | 1 | 1 | 0 |   |   |   |   |   |   |   |   |   |   |
| 5 |   |   |   |   | 1 | 1 | 0 |   |   |   |   |   |   |   |   |   |
| 6 |   |   |   |   |   | 1 | 1 | 0 |   |   |   |   |   |   |   |   |
| 7 |   |   |   |   |   |   | 1 | 1 | 0 |   |   |   |   |   |   |   |
| 8 |   |   |   |   |   |   |   | 1 | 1 | 0 |   |   |   |   |   |   |
| 9 |   |   |   |   |   |   |   |   | 1 | 1 | 0 |   |   |   |   |   |
| A |   |   |   |   |   |   |   |   |   | 1 | 1 | 0 |   |   |   |   |
| B |   |   |   |   |   |   |   |   |   |   | 1 | 1 | 0 |   |   |   |
| C |   |   |   |   |   |   |   |   |   |   |   | 1 | 1 | 0 |   |   |
| D |   |   |   |   |   |   |   |   |   |   |   |   | 1 | 1 | 0 |   |
| E |   |   |   |   |   |   |   |   |   |   |   |   |   | 1 | 1 | 0 |
| F |   |   |   |   |   |   |   |   |   |   |   |   |   |   | 1 | 1 |

Fig.18

| data type | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 0 | 1 | 1 | 1 | 1 | 1 | 1 | 1 | 1 | 1 | 1 | 1 | 1 | 1 | 1 | 1 |
| 2 | 0 | 0 | 1 | 1 | 1 | 1 | 1 | 1 | 1 | 1 | 1 | 1 | 1 | 1 | 1 | 1 |
| 3 | 0 | 0 | 0 | 1 | 1 | 1 | 1 | 1 | 1 | 1 | 1 | 1 | 1 | 1 | 1 | 1 |
| 4 | 0 | 0 | 0 | 0 | 1 | 1 | 1 | 1 | 1 | 1 | 1 | 1 | 1 | 1 | 1 | 1 |
| 5 | 0 | 0 | 0 | 0 | 0 | 1 | 1 | 1 | 1 | 1 | 1 | 1 | 1 | 1 | 1 | 1 |
| 6 | 0 | 0 | 0 | 0 | 0 | 0 | 1 | 1 | 1 | 1 | 1 | 1 | 1 | 1 | 1 | 1 |
| 7 | 0 | 0 | 0 | 0 | 0 | 0 | 0 | 1 | 1 | 1 | 1 | 1 | 1 | 1 | 1 | 1 |
| 8 | 0 | 0 | 0 | 0 | 0 | 0 | 0 | 0 | 1 | 1 | 1 | 1 | 1 | 1 | 1 | 1 |
| 9 | 0 | 0 | 0 | 0 | 0 | 0 | 0 | 0 | 0 | 1 | 1 | 1 | 1 | 1 | 1 | 1 |
| A | 0 | 0 | 0 | 0 | 0 | 0 | 0 | 0 | 0 | 0 | 1 | 1 | 1 | 1 | 1 | 1 |
| B | 0 | 0 | 0 | 0 | 0 | 0 | 0 | 0 | 0 | 0 | 0 | 1 | 1 | 1 | 1 | 1 |
| C | 0 | 0 | 0 | 0 | 0 | 0 | 0 | 0 | 0 | 0 | 0 | 0 | 1 | 1 | 1 | 1 |
| D | 0 | 0 | 0 | 0 | 0 | 0 | 0 | 0 | 0 | 0 | 0 | 0 | 0 | 1 | 1 | 1 |
| E | 0 | 0 | 0 | 0 | 0 | 0 | 0 | 0 | 0 | 0 | 0 | 0 | 0 | 0 | 1 | 1 |
| F | 0 | 0 | 0 | 0 | 0 | 0 | 0 | 0 | 0 | 0 | 0 | 0 | 0 | 0 | 0 | 1 |

Fig. 21 (a)

| PD Subject | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Lossless | 0 | 0 | 0 | 0 | 0 | 0 | 0 | 0 | 0 | 0 | 0 | 0 | 0 | 0 | 0 | 0 |
| 2K | 1 | 0 | 0 | 0 | 0 | 0 | 0 | 0 | 0 | 0 | 0 | 0 | 0 | 0 | 0 | 0 |
| 32K | 1 | 1 | 1 | 1 | 1 | 1 | 1 | 1 | 1 | 1 | 1 | 1 | 1 | 1 | 1 | 1 |

Fig. 21 (b)

| data type | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| Lossless | 0 | 0 | 0 | 0 | 0 | 0 | 0 | 0 | 0 | 0 | 0 | 0 | 0 | 0 | 0 | 0 |
| 2K | 0 | 0 | 0 | 0 | 0 | 0 | 0 | 0 | 0 | 0 | 0 | 0 | 0 | 0 | 0 | 0 |
| 32K | 0 | 1 | 1 | 1 | 1 | 1 | 1 | 1 | 1 | 1 | 1 | 1 | 1 | 1 | 1 | 1 |

APPARATUS FOR WRITING DATA AND METHOD FOR GENERATING DVD FORMAT DATA

CROSS-REFERENCE TO RELATED APPLICATIONS

This application is based upon and claims the benefit of priority from the prior Japanese Patent Application No. 2002-046591, filed on Feb. 22, 2002, the entire contents of which are incorporated herein by reference.

BACKGROUND OF THE INVENTION

The present invention relates to an apparatus for writing data, and more particularly, to an apparatus for writing data to various types of digital versatile disc (DVD) media, such as a DVD-R or a DVD-RW.

FIG. 1 is a schematic block diagram of a DVD-R medium data writing apparatus 100. The data writing apparatus 100 includes a microprocessor unit (MPU) 1, a controller controlled by the MPU 1, a buffer memory 3, a write channel 4, and a pickup 5. The controller 2 receives data from a host computer via an interface and processes the data. The processed data is stored in the buffer memory 3.

The controller 2 reads the data stored in the buffer memory 3 and provides the data and a clock signal to the write channel 4. The write channel 4 writes the data to a DVD-R medium 6 by means of a pickup 5.

As shown in FIG. 2, the controller 2 includes a host interface 7, an error corrector 10, and a formatter 20. The host interface 7 receives data, which is transferred from the host computer 8, and stores the data in the buffer memory 3. When the buffer memory 3 stores 32 Kbytes, or one block, of data, a host pointer 9 of the host interface 7 updates a pointer value and provides the updated value to the error corrector 10.

When the value of the host pointer 9 differs from the value of the error correction pointer 11, the error corrector 10 determines that 32 Kbytes of data is stored in the buffer memory 3 and reads the data from the buffer memory 3. The error corrector 10 generates an error detection code and scrambles the read data to generate data that complies with a DVD format. The DVD format data is then re-written to the buffer memory 3.

The operation of the error corrector 10 will now be discussed in detail with reference to FIGS. 3 and 4. Referring to FIG. 3, a single block 12 has 16 sectors 13, an error correction code PO, which has a length of 16 bytes in the vertical direction, and an error correction code PI, which has a length of 10 bytes in the horizontal direction. Each sector 13 includes six bytes of an ID section 14, six bytes of a copyright management information (CPR-MAI) section 15, two Kbytes of user data 16, and four bytes of an error detection code (EDC) section 17.

Referring to FIG. 5, the ID section 14 has one byte of sector information 18 and three bytes of sector addresses 19a, 19b, 19c. The ID section 14 also includes two bytes of a detection code, which is used to determine whether an error is included in the read ID section 14.

The CPR-MAI section 15 is used to restrict copying.

The EDC section 17 stores an error detection code, which is obtained by calculating the data included between the ID section 14 and the final byte of the user data 16.

The ID section 14 and the CPR-MAI section 15 are normally set in a register of the error corrector 10 or a predetermined area of the buffer memory 3. The ID section 14 and the CPR-MAI section 15 are used as part of the data when the error detection code or the error correction code is generated.

The generation of the error correction codes PI, PO will now be discussed. Referring to FIG. 4, the error corrector 10 first reads user data from the buffer memory 3 and uses the ID section 14 and the CPR-MAI section 15, which are stored in the error corrector 10, to generate an error detection code that is to be stored in the EDC section 17 (step S1).

The error corrector 10 then re-writes the data to the error corrector 10 (step S2). In this state, the user data 16 is scrambled. In the scrambling process, for example, an exclusive OR operation is performed with the data and a value obtained through a predetermined formula.

After the processing of step S2 is performed for 16 sectors, the error corrector 10 reads data from the buffer memory 3 again (step S3) and generates the error correction codes PI, PO. The error corrector 10 re-writes a block of data, to which the error correction codes PI, PO are added, to the buffer memory 3 (step S4). In this state, the error correction codes PI, PO must be generated separately from each other. Thus, steps S3 and S4 are repeated twice.

When the generation of the error correction codes PI, PO is completed; the error corrector 10 updates the value of the error correction pointer 11 and provides the updated value to the formatter 20.

When the updated value of the error correction pointer 11 differs from the value of a disc control pointer 21 of the formatter 20, the formatter 20 reads a block of data from the buffer memory 3 and writes the data to the DVD-R medium 6.

Comparison between the value of the error correction pointer 11 and the value of the disc control pointer 21 in the formatter 20 is performed when the writing of the block starts. When there is no difference between the value of the pointer 11 and the value of the pointer 21, this indicates that the generation of the error correction codes PI, PO in the error corrector 10 was not on time. In such a case, the data that is to be written to the medium 6 is not stored in the buffer memory 3. Thus, the formatter 20 determines that a data empty state has occurred and suspends the writing process.

A characteristic process that is performed when data is written to the DVD-R medium 6 will now be discussed. When writing data to the DVD-R medium 6, the data processing of a linking loss area, the bit adding of a data ID section, and the writing of data to a linking portion must be performed.

The linking portion refers to a connecting portion between the terminal end of the previously written data and the first end of the data that is to be written next. The linking portion is used so that connecting portions are smoothly reproduced during reproduction of written data.

Referring to FIG. 6, the final portion of the final block B1 of the previously written data must be extended to a position that is somewhat advanced from the head of a head block B2 of further data that is to be written. The final block B1 is written up to a final end BE, which is extended from a final end DE of the data by a length corresponding to a linking portion 23. The linking portion 23 includes a sync mark SYNC, ID section data, and 00h data. The head block B2 of the further data must be written within several bytes of the final end BE of the previously written data.

The final block B1 and the head block B2 must be provided with a linking loss area. Although a single block of DVD data consists of 32 Kbytes (16 sectors), when the total data amount of the data that is to be written cannot be equally divided by 32 Kbytes, linking loss areas are provided in the final block B1 and the head block B2.

The linking loss may be a 32k link, which is shown in FIG. 7(a), or a 2k line, which is shown in FIG. 7(b). The 32k link is used when the valid sector data of the final block B1 is less than 16 sectors. In such a case, the linking loss area is formed from the insufficient data sectors and the 16 sectors of the head block B2 of the further data that is to be written next.

The 2K link is used when the valid sector data of the final block B1 is less than 16 sectors. In this case, the linking loss area is formed from the insufficient data sectors and the two sectors of the head block B2 of the further data that is to be written next.

FIG. 7(c) shows an example in which the final block B1 has exactly 16 sectors of valid sector data and a linking loss area is not provided in the following head block. Such a case is referred to as a loss-less link.

The padding of 00h data in the user data section of each sector forming the linking loss area is standardized. Further, when a linking loss area is formed, "1" must be set at the 25th bit (data type) of the ID section of some sectors.

In the 32k link of FIG. 7(a), subject sectors OS to which "1" is set at the 25th bit are the final sector storing valid sector data and the insufficient data sectors in the final block B1 and the sectors excluding the head and final sectors of the linking loss area in the head block B2. In the 2k link of FIG. 7(b), "1" is set at the 25th bit of the final sector storing valid sector data and the insufficient data sectors in the final block B1.

The MPU 1 controls the writing completion process of the DVD-R medium 6. The completion process will now be discussed with reference to FIG. 8.

When the MPU 1 detects the completion timing of the data transferred from the host computer (step S11), the MPU 1 performs a padding process to write 00h data to the insufficient data sectors of the final block B1 (step S12).

The padding process is performed by preparing hardware for writing 00h to the insufficient data sectors or by writing 00h to the insufficient data sectors in the buffer memory 3.

Then, since the setting of the data type to the 25th bit of the ID section 14 is necessary, the MPU 1 instructs the error corrector 10 to set the data type bits (step S13).

The MPU 1 then instructs the error corrector 10 to generate an error correction code. The MPU 1 updates the host pointer 9 of the host interface 7 to instruct the generation of the error correction code (step S14). Then, the error corrector 10 generates an error correction code of the final block B1.

After the generation of the error correction code is completed, the MPU 1 generates the data of the linking portion 23 (step S15) and updates the value of the block counter 22 of the formatter 20 (steps S16, S17).

In step S16, an updating process of the block counter 22 is performed so that the timing the MPU 1 updates the block counter 22 does not coincide with the timing the formatter 20 updates the block counter 22. This prevents erroneous operations during the updating process of the block counter 22.

The formatter 20 determines the write completion position from the value of the block counter 22 and performs the linking process to complete the writing process.

The operation of the formatter 20 during the writing completion process will now be discussed with reference to FIG. 9.

The formatter 20 performs the data writing process on the DVD-R medium 6 in a block by block manner. Whenever the formatter 20 completes the writing process of each block, the formatter 20 checks whether or not the data of the block that will undergo the next writing process is valid. More specifically, when the writing process of one block is completed (step S21), the formatter 20 checks the value of the block counter 22 (step S22). If the value is greater than "1", the formatter 20 checks whether or not the data of the next block that is to be write-processed is valid (step S23).

To check the data, the formatter 20 compares the value of the error correction pointer 11 of the error corrector 10 with the value of its disc control pointer 21. If the values do not coincide with each other, the formatter 20 determines that the data that is to be write-processed is stored in the buffer memory 3. In this case, the formatter 20 subtracts "1" from the value of the block counter 22 (step S24) and returns to step S21 to perform the writing process on the next block.

In step S23, if the value of the pointer 11 and the value of the pointer 21 are substantially the same, the formatter 20 determines that data that is to be write-processed is not yet stored in the buffer memory 3 and detects a data empty error (step S25). This completes the writing process.

In step S22, if the value of the block counter 22 is "1" or less, the formatter 20 determines that the writing process of the final block B1 has been completed. Thus, the formatter 20 performs the writing process on the linking portion 23 (step S26) and completes the writing process.

When the DVD-R medium 6 undergoes the above writing completion process, the MPU 1 must perform the 00h padding process on the linking loss area, set the data type in the ID section 14 of the subject sector in the linking loss area, instruct the generation of the error correction code, generate the data written to the linking portion 23, and instruct the formatter 20 to complete the writing process. In other words, in the writing process for the DVD-R medium 6, the data transfer amount is not known beforehand. Thus, the above writing completion process must be performed after receiving a transfer completion command from the host computer 8.

When it takes time to perform the above writing completion operation, a data empty error may occur in the formatter 20. Data cannot be re-written to the DVD-R medium 6. Thus, when a data empty error occurs, the data that has been written is discarded. Further, data must be re-written to a new area from the beginning. Accordingly, when a data empty error occurs, the data write processing efficiency decreases.

SUMMARY OF THE INVENTION

A perspective of the present invention is an apparatus for writing block data, which includes a plurality of sectors, to a recording medium. The apparatus includes a controller for generating the block data and writing the block data to the recording medium. The controller performs a padding process on final block data when the final block data is written to the recording medium. A processing unit controls the controller. The controller includes a padding processing circuit for generating padding process data.

A further perspective of the present invention is an apparatus for writing block data, which includes a plurality of sectors, to a recording medium. Each sector includes an identification data section. The apparatus includes a controller for generating the block data and writing the block data to the recording medium. The controller performs a padding process on final block data when the final block data is written to the recording medium. A processing unit controls the controller. The controller includes a padding processing circuit for generating padding process data. A data type setting unit sets a data type to the identification data section of each sector of the final block.

A further perspective of the present invention is an apparatus for writing block data, which includes a plurality of sectors, to a recording medium. The apparatus includes a controller for generating the block data and writing the block data to the recording medium. The controller performs a padding process on head block data when the head block data is written to the recording medium. A processing unit controls the controller. The controller includes a padding processing circuit for generating padding process data.

A further perspective of the present invention is a method for generating block data that includes a plurality of sectors and is written to a recording medium. The method includes storing user data in a buffer memory, reading the user data from the buffer memory with an error corrector to generate block data and store the block data in the buffer memory, reading the block data from the buffer memory to write the block data to the recording medium, and generating padding process data to perform a padding process on a final block data with the error corrector when generating final block data, which is written to the recording medium.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12 is a conversion table used by a decoding circuit of the error corrector shown in FIG. 11;

FIG. 16 is a diagram illustrating a conversion table used by a decoding circuit of the data writing apparatus shown in FIG. 15;

FIG. 18 is a diagram illustrating a conversion table used by a decoding circuit of the data writing apparatus shown in FIG. 17;

FIG. 21 is a diagram illustrating a conversion table used by a decoding circuit of the data writing apparatus shown in FIG. 20;

DETAILED DESCRIPTION OF THE PREFERRED EMBODIMENTS

Figure 1:
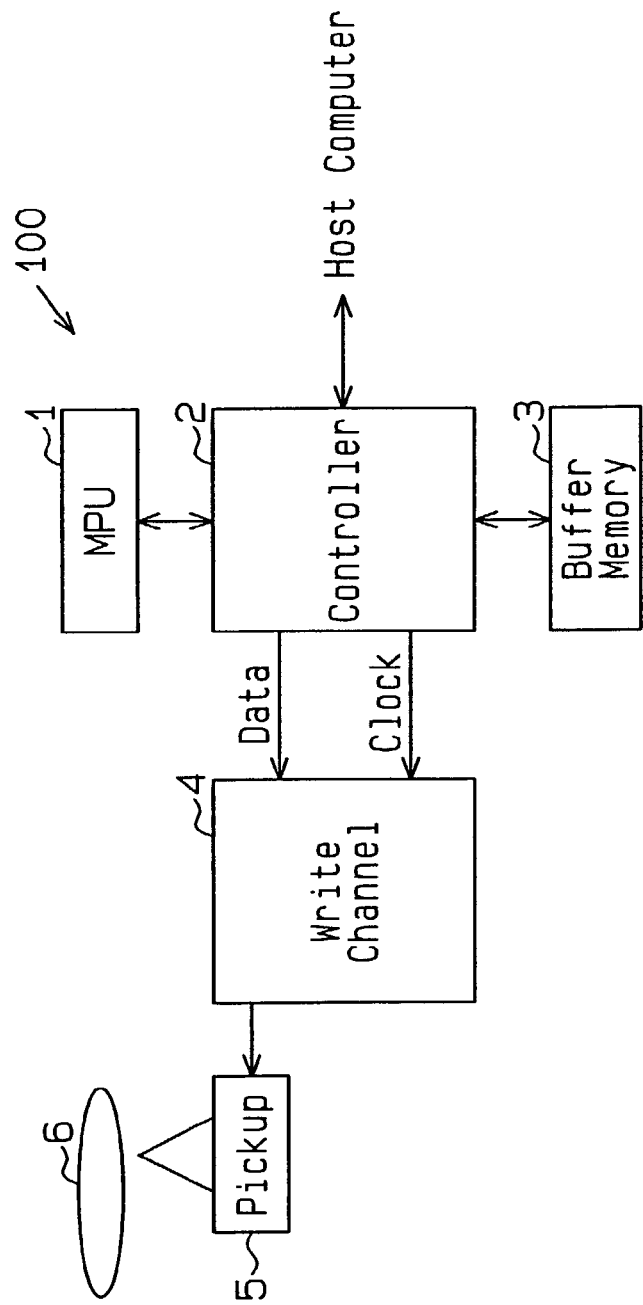
FIG. 1 is a schematic block diagram of a prior art data writing apparatus.

In the drawings, like numerals are used for like elements throughout.

Figure 10:
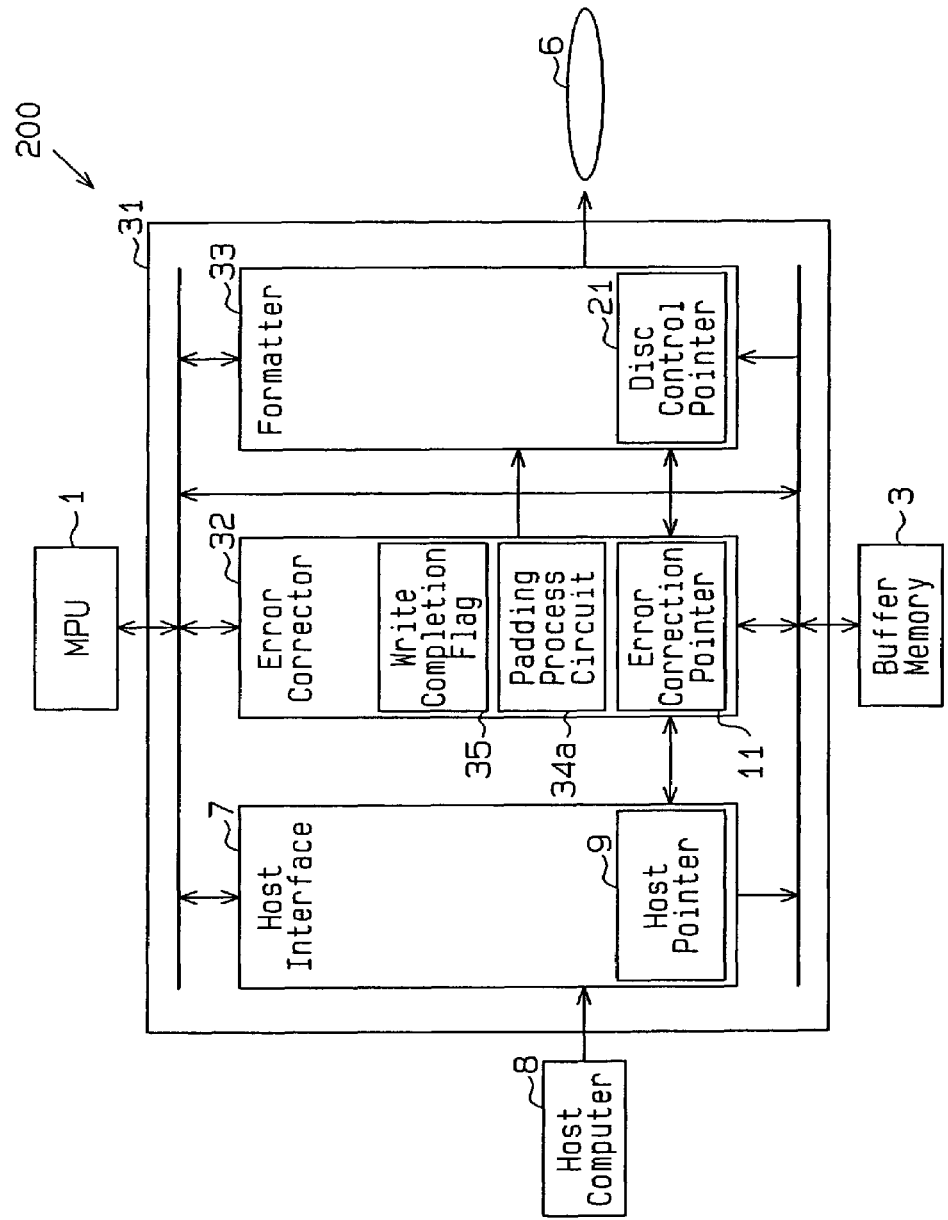
FIG. 10 is a schematic block diagram of a data writing apparatus according to a first embodiment of the present invention.

FIG. 10 is a schematic block diagram of a data writing apparatus 200 according to a first embodiment of the present invention. The data writing apparatus 200 includes an MPU 1, a controller 31, a buffer memory 3, a write channel 4, and a pickup 5. The controller 31 includes a host interface 7, an error corrector 32, and a formatter 33.

The error corrector 32 includes an error correction pointer 11, a padding processing circuit 34a, and a write completion flag 35.

Figure 2:
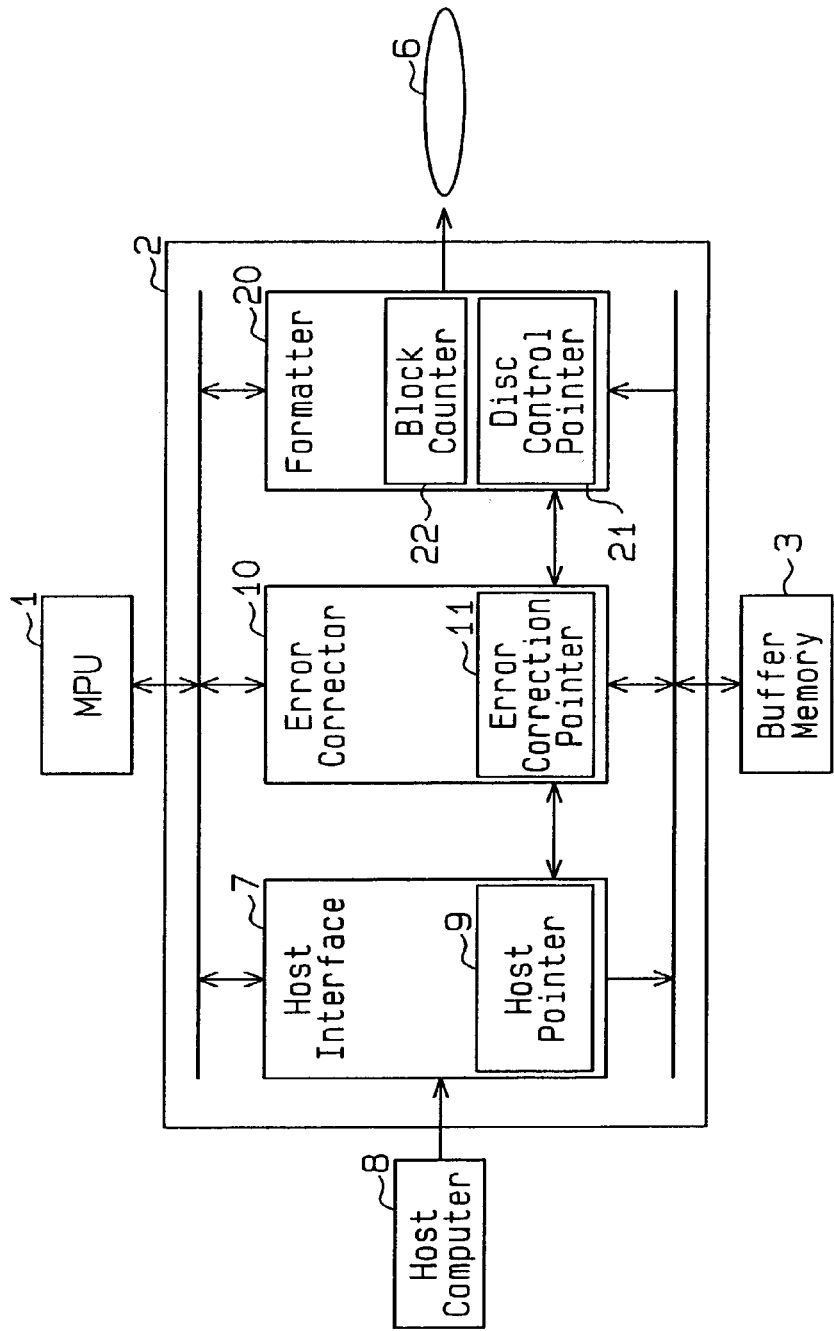
FIG. 2 is a schematic block diagram of a controller of the data writing apparatus of FIG. 1.

The formatter 33 includes a disc control pointer 21 but does not include the block counter 22 of FIG. 2.

Figure 11:
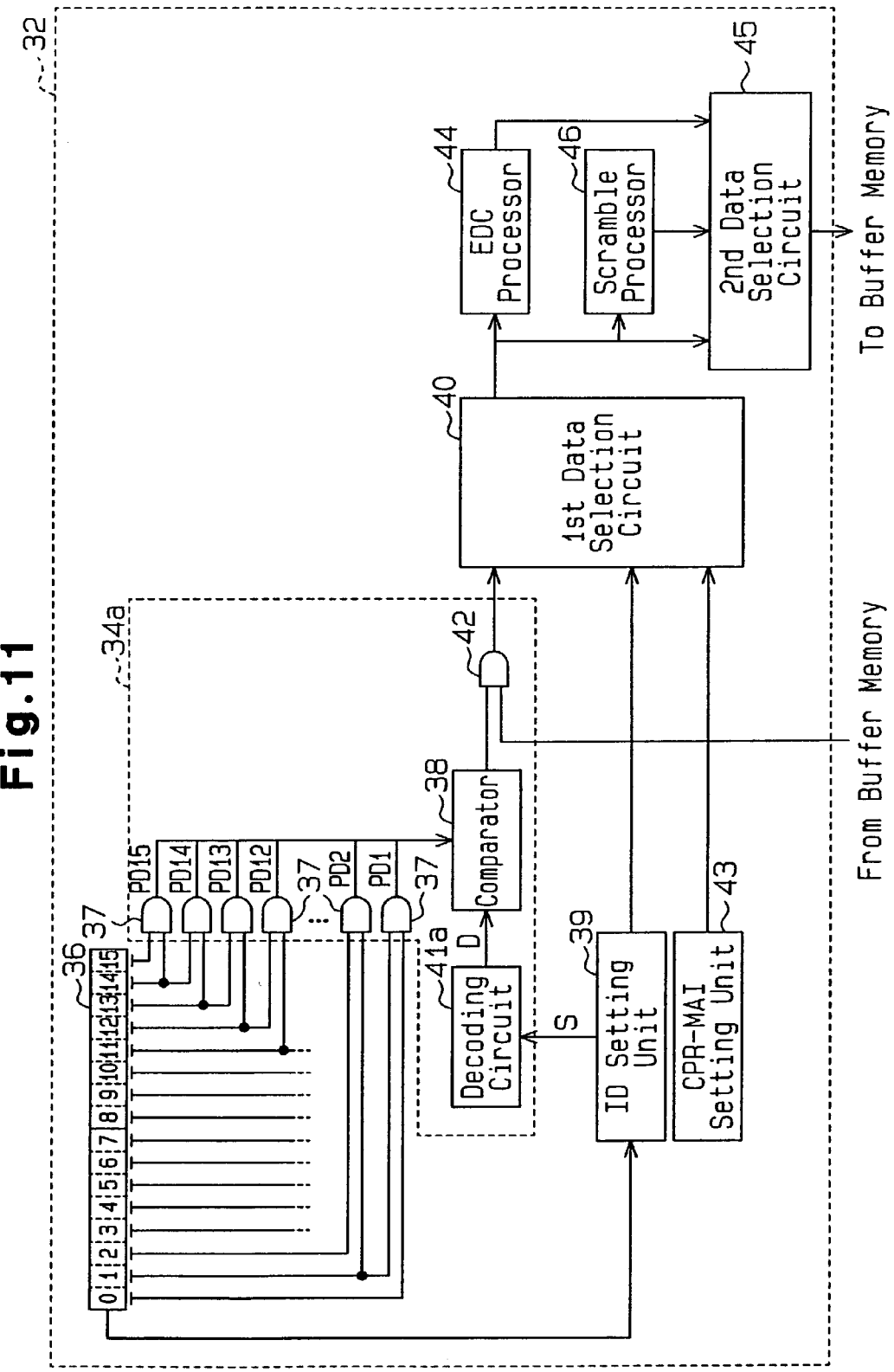
FIG. 11 is a schematic block diagram of an error corrector of the data writing apparatus shown in FIG. 10.

The padding processing circuit 34a of the error corrector 32 will now be discussed with reference to FIG. 11. The padding processing circuit 34a includes 15 (fifteen) AND circuits 37, a decoding circuit 41a, a comparator 38, and an AND circuit 42.

The 15 AND circuits 37 are connected to a data type setting register 36, which is flip-flop circuit having 16 bits. The register 36, which is incorporated in the error corrector 32, is used to store data type setting data, which is used to set the data type at the 25th bit of a predetermined sector in the final block of the write data. The register 36 has register sixteen bits each respectively corresponding to the sixteen sectors of the final block.

Figure 7A:
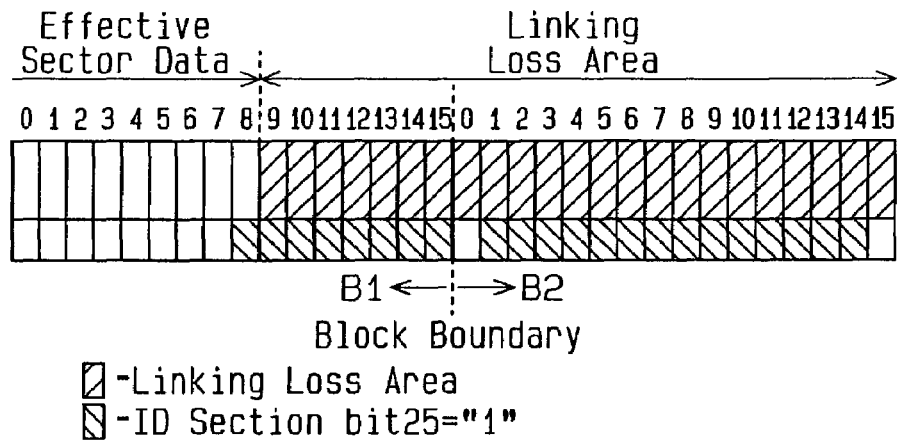
FIGS. 7(a) to 7(c) are diagrams illustrating data linking loss area.

For example, as shown in FIG. 7(a), when the valid sector data is the first sector 0 to sector 8, the MPU 1 stores "0" from the 0th bit to the 7th bit and stores "1" from the 8th bit to the 15th bit.

The data of the adjacent two bits stored in the data type setting register 36 is provided to the corresponding AND circuit 37. The output signals PD1 to PD15 of the 15 AND circuits 37 indicate the padding process subject sector. For example, when "0" is stored in the 0th to 7th bit of the register 36 and "1" is stored in the 8th bit to the 15th bit, the output signals PD1 to PD8 indicate "0" and the output signals PD9 to PD15 indicate "1". Accordingly, in this case, the 10th sector 9 to the 16th sector 15 are detected as the padding process subject sector. The output signals PD1 to PD15 of the 15 AND circuits 37 are provided to the comparator 38.

Figure 5:
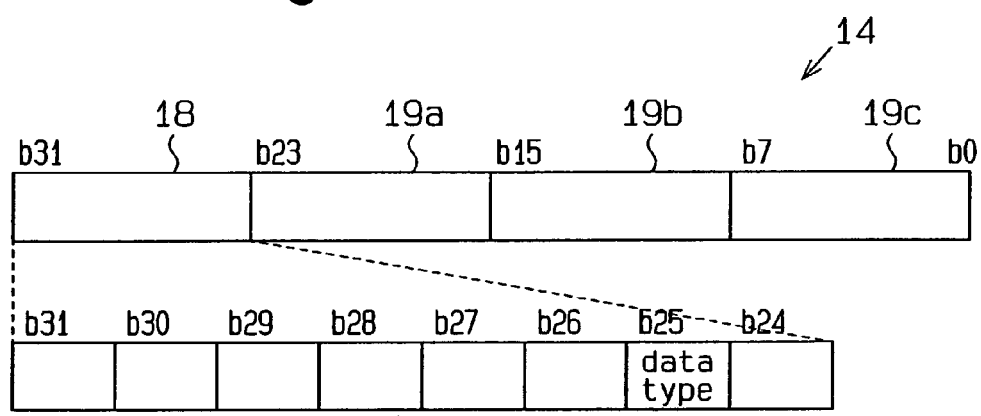
FIG. 5 is a diagram illustrating an ID section of the sector data.
Figure 6:
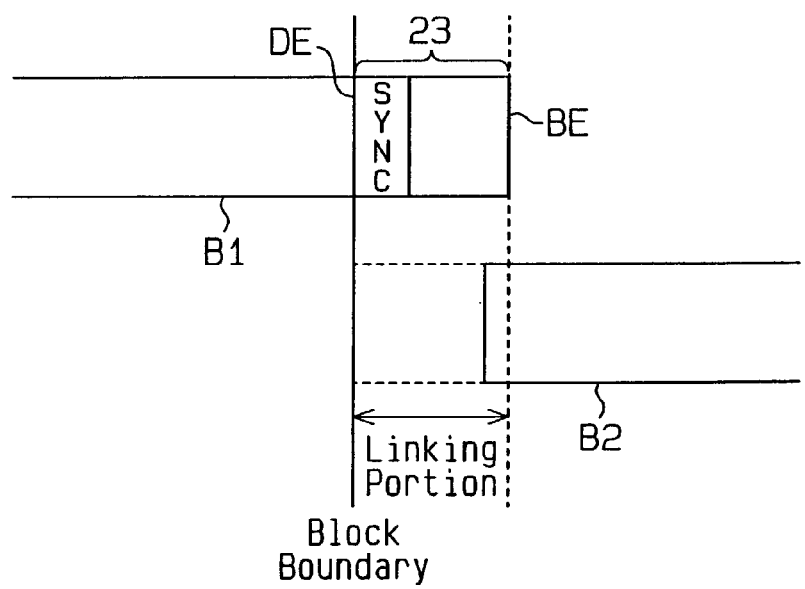
FIG. 6 is a diagram illustrating a data linking portion.

The ID setting unit (data type setting unit) 39 receives the output signal of each bit of the data type setting register 36 and generates the data stored in a data ID section 14, as shown in FIG. 5. That is, the ID setting unit 39 generates four bytes of the ID section 14 and two bytes of an error detection code and provides the generated data to a first data selection circuit 40.

The ID setting unit 39 further determines the value that is to be set to the 25th bit of each sector based on the output signal of the data type setting register 36. For example, when "0" is stored in the 0th to 7th bits of the register 36 and "1" is stored in the 8th to 15th bit, "1" is set in the 25th bit of each of the sectors 8 to 15.

The ID setting unit 39 further performs data processing in a sector by sector manner and increments the ID value (i.e., sector address) whenever data processing one sector. The 3rd to 0th bit of the ID value is set as a sector value S. Based on the sector value S and the value of each bit of the data type setting register 36, the sector to which "1" is to be set to the 25th bit is determined.

The decoding circuit 41a receives the sector value S from the ID setting unit 39 and decodes the sector value S using a conversion table, which is shown in FIG. 12, to generate a decoded value D. The decoded value D is generated by converting the sector value S to a binary signal having 16 bits and is provided to the comparator 38.

The comparator 38 compares the output signals PD1 to PD15 of the AND circuit 37 with the 15 bits of the decoded value D from which the lowermost value is excluded. For example, when the sector value S is 10 (i.e., the decoded value being "0000000000100000") and the output signal PD10 is "1", it is determined that the 10th sector is the padding processing subject sector. Thus, the comparator 38 provides an AND circuit 42 with signal "0", which indicates that the 10th sector is the padding processing subject sector. In such a manner, when a writing process is performed on each sector, the comparator 38 determines whether or not the present sector is the padding processing subject sector.

The AND circuit 42 is provided with user data of the sector that is being processed from the buffer memory 3. When provided with signal "0" from the comparator 38 (i.e., when the present sector is the padding processing subject sector), the AND circuit 42 provides all of the "0" user data to the first data selection circuit 40. When the comparator 38 provides signal "1" to the AND circuit 42 (i.e., when the present sector is not the padding processing subject sector), the user data is provided to the first data selection circuit 40 without being processed.

The first data selection circuit 40 receives the user data provided from the AND circuit 42, six bytes of ID section data provided from the ID setting unit 39, and six bytes of CPR-MAI section data provided from the CPR-MAI setting unit 43. The first data selection circuit 40 then outputs data in the order of the ID section data, the CPR-MAT data, and 2048 bytes of user data.

An EDC processor 44 receives all of the data provided from the first data selection circuit 40 and generates an EDC detection code.

A scramble processor 46 receives user data from the first data selection circuit 40 and performs a scrambling process on the user data.

Figure 3:
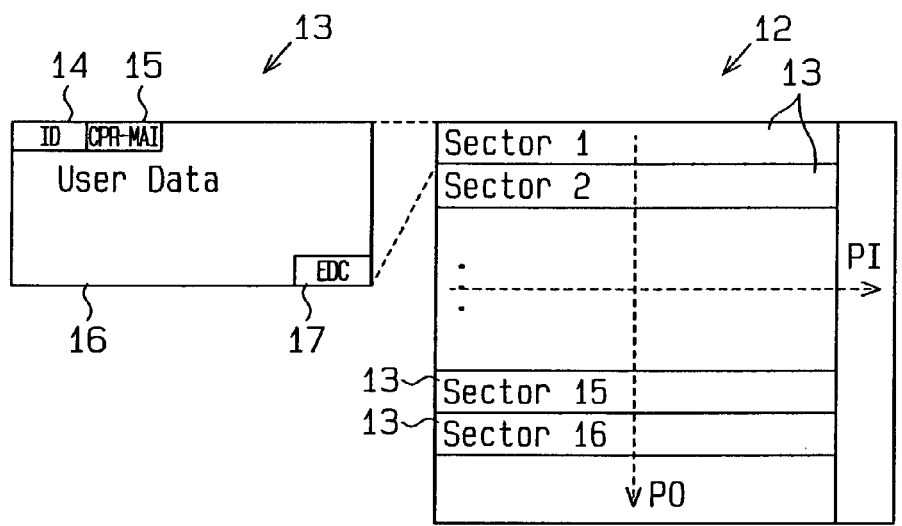
FIG. 3 is a diagram illustrating the data format of a DVD.
Figure 4:
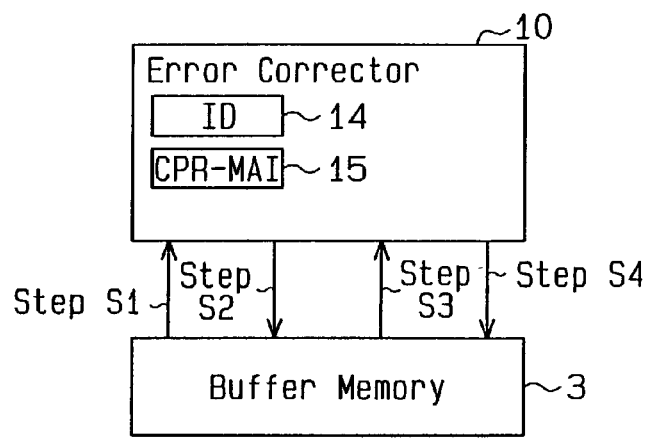
FIG. 4 is a diagram illustrating the procedure for performing an error correction in the DVD.

The second data selection circuit 45 receives the output data of the first data selection circuit 40, an error detection code (EDC) of the EDC processor 44, and the user data scrambled by the scramble processor 46. To write data in each sector in the order shown in FIG. 3, the second data selection circuit 45 provides the buffer memory 3 with data in the order of the ID section data, the CPR-MAI section data, the scrambled user data, and the EDC section data.

The write completion flag 35 of the error corrector 32 is set when the generation of the error correction code of the final block is set. The set flag is provided to the formatter 33.

Figure 13:
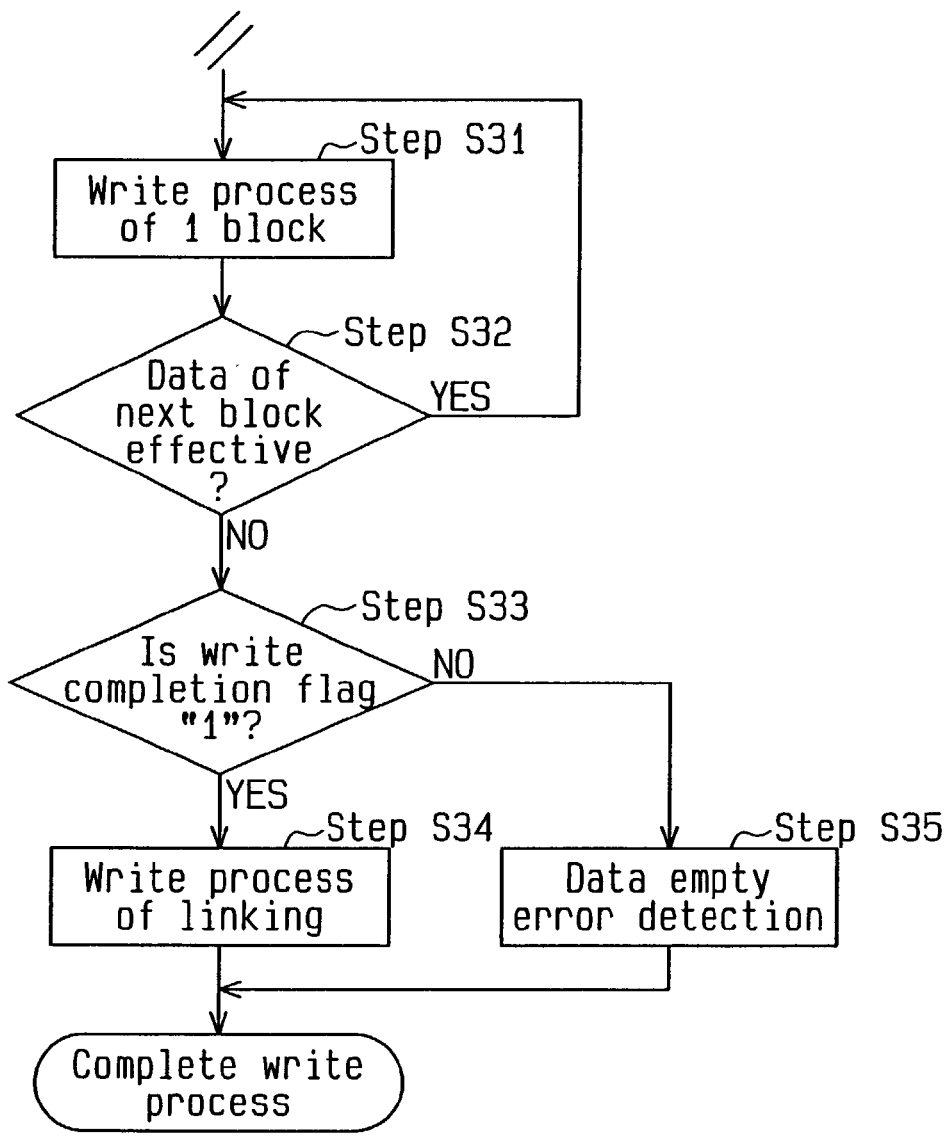
FIG. 13 is a flowchart illustrating a process performed by a formatter of the data writing apparatus shown in FIG. 10.

FIG. 13 illustrates a writing process performed by the formatter 33. The formatter 33 performs the writing process on the DVD-R medium 6 in a block by block manner (step S31). The formatter 33 detects whether the write data of the next block is valid each time the writing process of a block of data is completed. That is, the formatter 33 detects whether the value of the error correction pointer 11 of the error corrector 32 substantially coincides with the value of the disc control pointer 21 of the formatter 33 (step S32).

Normally, when the writing process is performed on a block other than the final one, the value of the error correction pointer 11 and the value of the disc control pointer 21 substantially do not coincide with each other. Thus, the formatter 33 determines that the write data of the next block is valid and performs the writing process on the write data of the next block that is stored in the buffer memory 3 (step S31, S32).

At step S31, when the writing of data of the final block is completed, the write data of the next block does not exist in the buffer memory 3. In this case, the value of the error correction pointer 11 and the value of the disc control pointer 21 substantially coincide with each other, and the formatter 33 determines that the write data of the next block is not valid (step S32).

Then, the formatter 33 checks the value of the write completion flag 35 of the error corrector 32 (step S33). The write completion flag 35 is set at "1" when the generation of the error correction code of the final block is completed. Thus, the formatter 33 performs the writing process subsequent to the writing process of the final block (step S34) and then completes the writing process.

In step S32, when the value of the error correction pointer 11 and the value of the disc control pointer 21 substantially coincide with each other during the writing process of a block other than the final one, the write completion flag 35 is "0" in step S35. Accordingly, the formatter 33 detects a data empty error (step S35) and completes the writing process.

Figure 14:
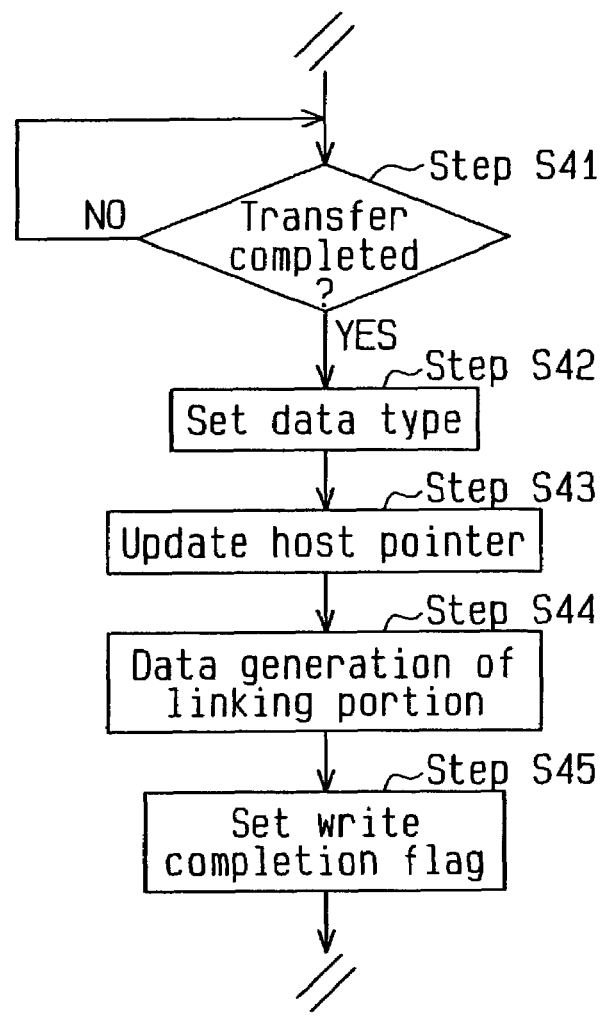
FIG. 14 is a flowchart illustrating a writing completion process performed by an MPU of the data writing apparatus of FIG. 10.

FIG. 14 illustrates the writing completion process performed by the MPU 1 (central processing unit). When the MPU 1 detects that the transfer of write data by the host computer 8 has been completed (step S41), the MPU 1 sets the data type to the data type setting register 36 (step S42).

The MPU 1 updates the host pointer 9 of the host interface 7 (step S43). As a result, the error corrector 32 sets the data type to the 25th bit of each sector of the final block based on the set data of the data type setting register 36 and further detects the sector that is to undergo the padding process. In this manner, the error corrector 32 performs the padding process on the subject sector.

Then, the error corrector 32 generates the ID section of each sector in the final block, the CPR-MAI section, the scrambled user data, and the EDC section. While the error corrector 32 is generating these data, the MPU 1 generates the data that is to be written to the linking section (step S44).

In compliance with the DVD-R General Version 2.0 standard, 16 bytes of data is written subsequent to the write data of the final block in the linking portion 23. The 16 bytes of data includes 12 bytes of the ID section and the CPR-MAI section and 4 bytes of user data. Accordingly, the MPU 1 generates only the 4 bytes of user data and writes data including the user data of the linking portion (step S44).

The MPU 1 then sets "1" to the write completion flag 35 of the error corrector 32 (step S45) and waits for an instruction from the host computer 8.

The data writing apparatus 200 of the first embodiment has the advantages described below.

(1) The MPU 1 stores data in the data type setting register 36. Based on the stored data, the ID setting unit 39 of the error corrector 32 sets the data type to the 25th bit of the ID section 14 of each sector in the final block. This reduces the time required for the MPU 1 to perform the writing process and prevents the occurrence of a data empty error.

(2) Each AND circuit 37 of the padding processing circuit 34a detects the sector that must undergo the padding process by performing an AND logic operation with the associated adjacent bits of the data setting register 36. This decreases the load applied to the MPU 1 and reduces the time required for the MPU 1 to perform the writing completion process.

(3) With regard to the sector that requires the padding process to be performed, the error corrector 32 generates 00h write data for performing the padding process and rewrites the data to the buffer memory 3. This decreases the load applied to the MPU 1 and reduces the time required for the MPU 1 to perform the writing completion process.

(4) The comparator 38 compares a sector value decoded signal D of the decoding circuit 41a with the output signals PD1 to PD15 of the AND circuit 37. The AND circuit 42 performs an AND logic operation with the comparison result and the write data read from the buffer memory 3 to generate the 00h write data for performing the padding process. This decreases the load applied to the MPU 1 and reduces the time required for the MPU 1 to perform the writing completion process.

(5) The 00h write data for performing the padding process is generated without the MPU 1 just by adding the padding processing circuit 34a to the error corrector 32.

(6) The MPU 1 generates the data written to the linking portion parallel to the data processing of the final block of the error corrector 32. This reduces the time required to perform the writing process and prevents the occurrence of a data empty error.

(7) When the write completion flag 35 of the error corrector 32 is set at "1", which indicates that the generation of the error correction code of the final block has been generated, the formatter 33 immediately performs the writing process on the linking portion 23 after the writing process of the final block is completed. Accordingly, the occurrence of a data empty error is prevented before proceeding to the writing process of the linking portion 23.

(8) The error corrector 32 generates the padding data, sets the data type of the ID section 14, and generates the ID section data and the CPR-MAI data written to the linking portion 23. This decreases the load applied to the MPU 1 and reduces the time required for the MPU 1 to perform the writing completion process. As a result, the occurrence of a data empty error is prevented, and the efficiency of the writing process increases.

Figure 15:
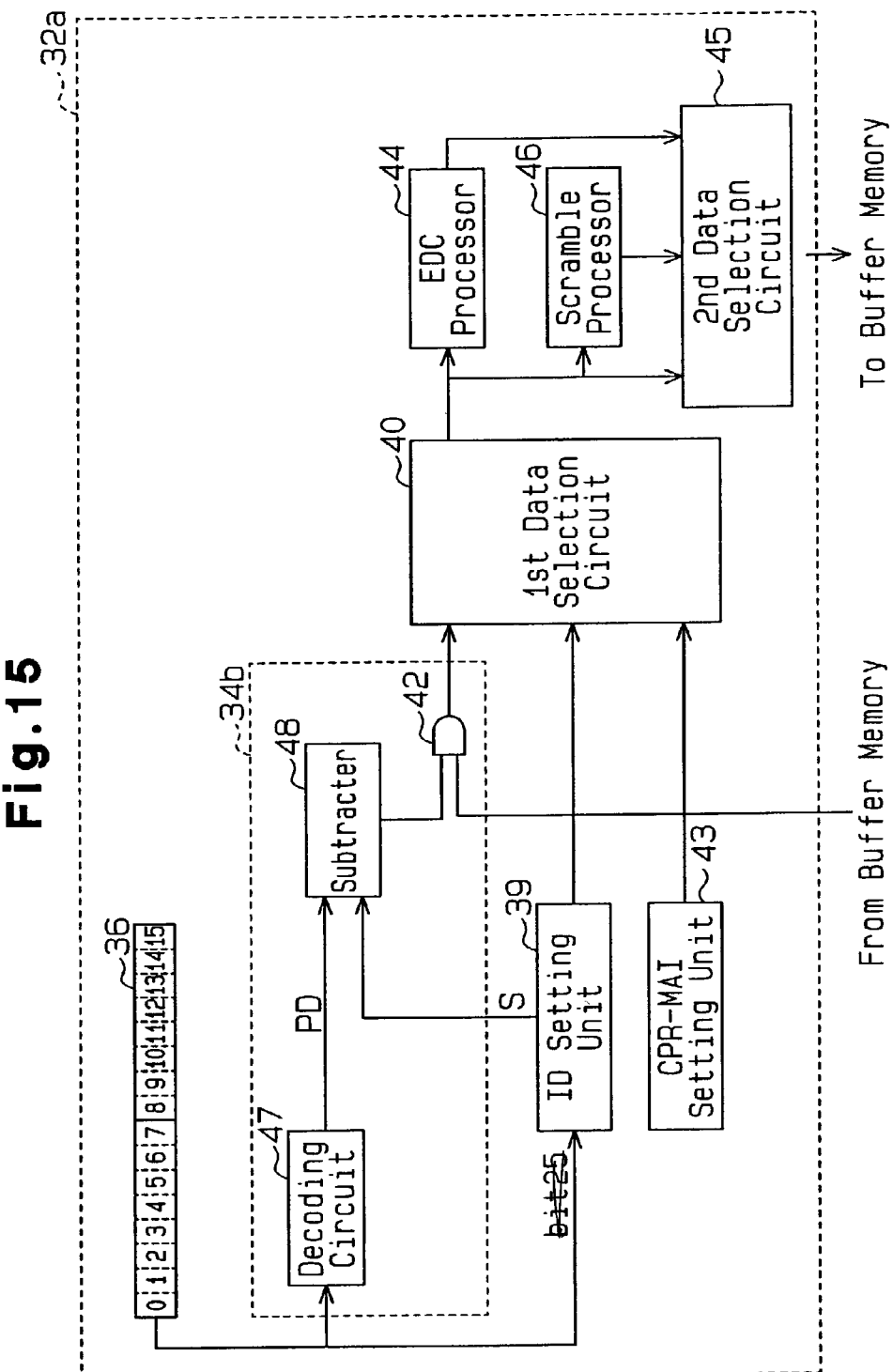
FIG. 15 is a schematic block diagram of a data writing apparatus according to a second embodiment of the present invention.

FIG. 15 is a schematic block diagram illustrating an error corrector 32a of a data writing apparatus according to a second embodiment of the present invention. The error corrector 32a includes a padding processing circuit 34b. The padding processing circuit 34b includes a decoding circuit 47, a subtracter 48, and an AND circuit 42.

The decoding circuit 47 uses the conversion table shown in FIG. 16 to decode the data stored in each bit of the data type setting register 36 and generate a PD value. More specifically, among sectors 0 to 15, which form the final block, if, for example, the data type of the sectors 8 to 15 is "1", the decoding circuit 47 generates the PD value of "9". This indicates that sectors 9 to 5 are the padding subject sectors.

The subtracter 48 receives the PD value from the decoding circuit 47 and the sector value S from the ID setting unit 39. Then, the subtracter 48 subtracts the PD value from the sector value S. When the subtraction result is 0 or greater, the subtracter 48 provides the AND circuit with a low level signal. That is, when the PD value is "9", the padding process is performed on sectors 9 to 15. The writing apparatus incorporating the padding processing circuit 34b has the same advantages as the first embodiment. Further, the configuration of the padding processing circuit 34b is simplified.

Figure 17:
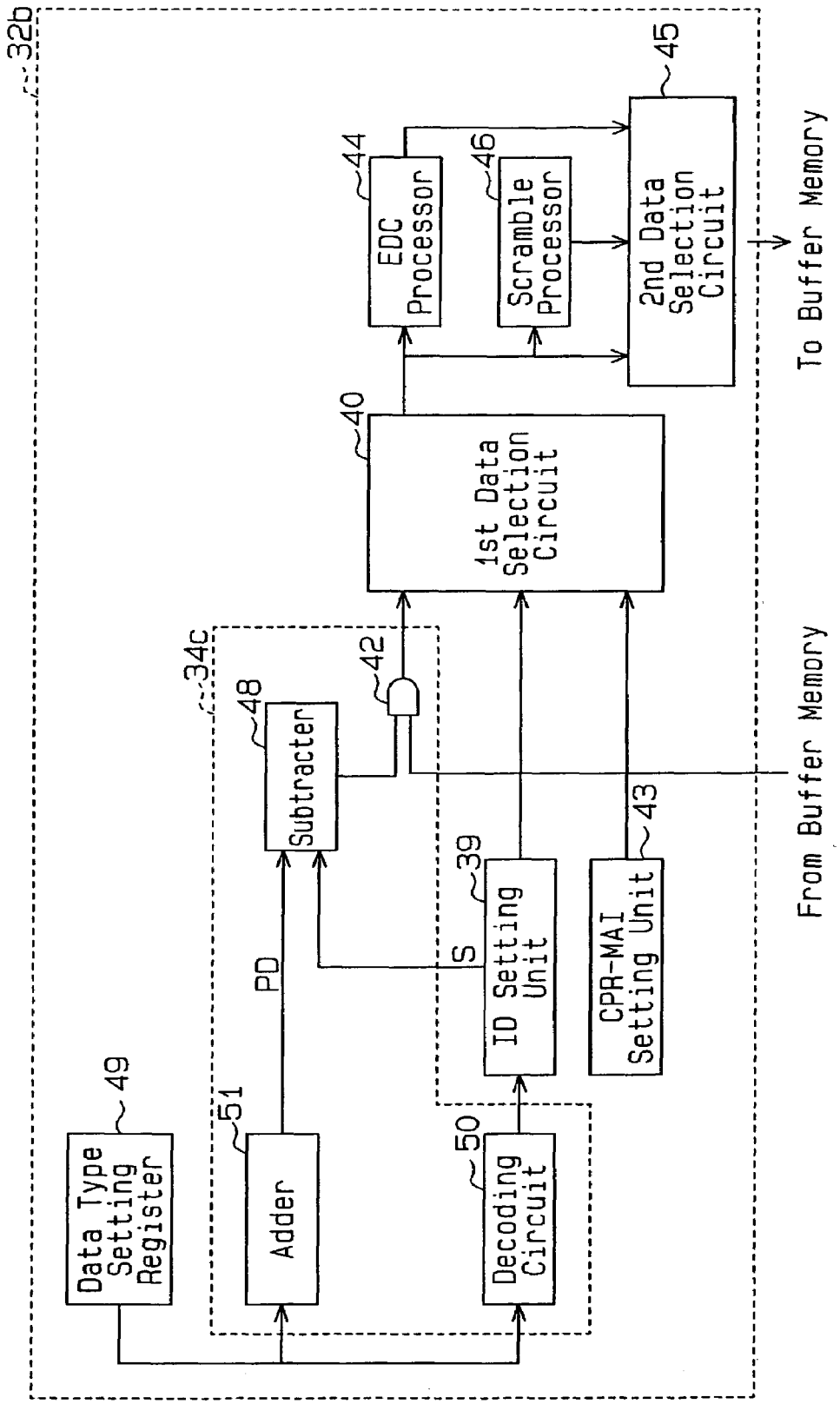
FIG. 17 is a schematic block diagram of a data writing apparatus according to a third embodiment of the present invention.

FIG. 17 is a schematic block diagram illustrating an error corrector 32b of a data writing apparatus according to a third embodiment of the present invention. The error corrector 32b includes a padding processing circuit 34c and a data type setting register 49.

The data type setting register of the first and second embodiments is a 16 bit register associated with each sector of the final block. However, in the third embodiment, the MPU 1 sets the first sector value that sets "1" as the data type in the final block in the data type setting register 49.

The padding processing circuit 34c includes an AND circuit 42, a subtracter 48, a decoding circuit 50, and an adder 51. The decoding circuit 50 receives the sector value from the data type setting register 49 and uses a conversion table, which is shown in FIG. 18, to convert the sector value to 16 bits of data type setting data.

The data type setting data corresponds to the data type setting data stored in the data type setting register 36 of the first and second embodiments. That is, the data type setting data indicates the sector to which "1" must be set in the data type. The data type setting data of the decoding circuit 50 is provided to the ID setting unit 39.

The adder 51 receives the sector value from the data type setting register 49 and adds "1" to the sector value to generate the PD value. The PD value is provided to the subtracter 48. The value obtained by adding "1" to the sector value of the data type setting register 49 indicates the sector from which the padding process is to be started.

In this manner, the MPU 1 only needs to set the first sector value that sets "1" as the data type in the data type setting register 49. This reduces the load applied to the MPU 1.

Figure 19:
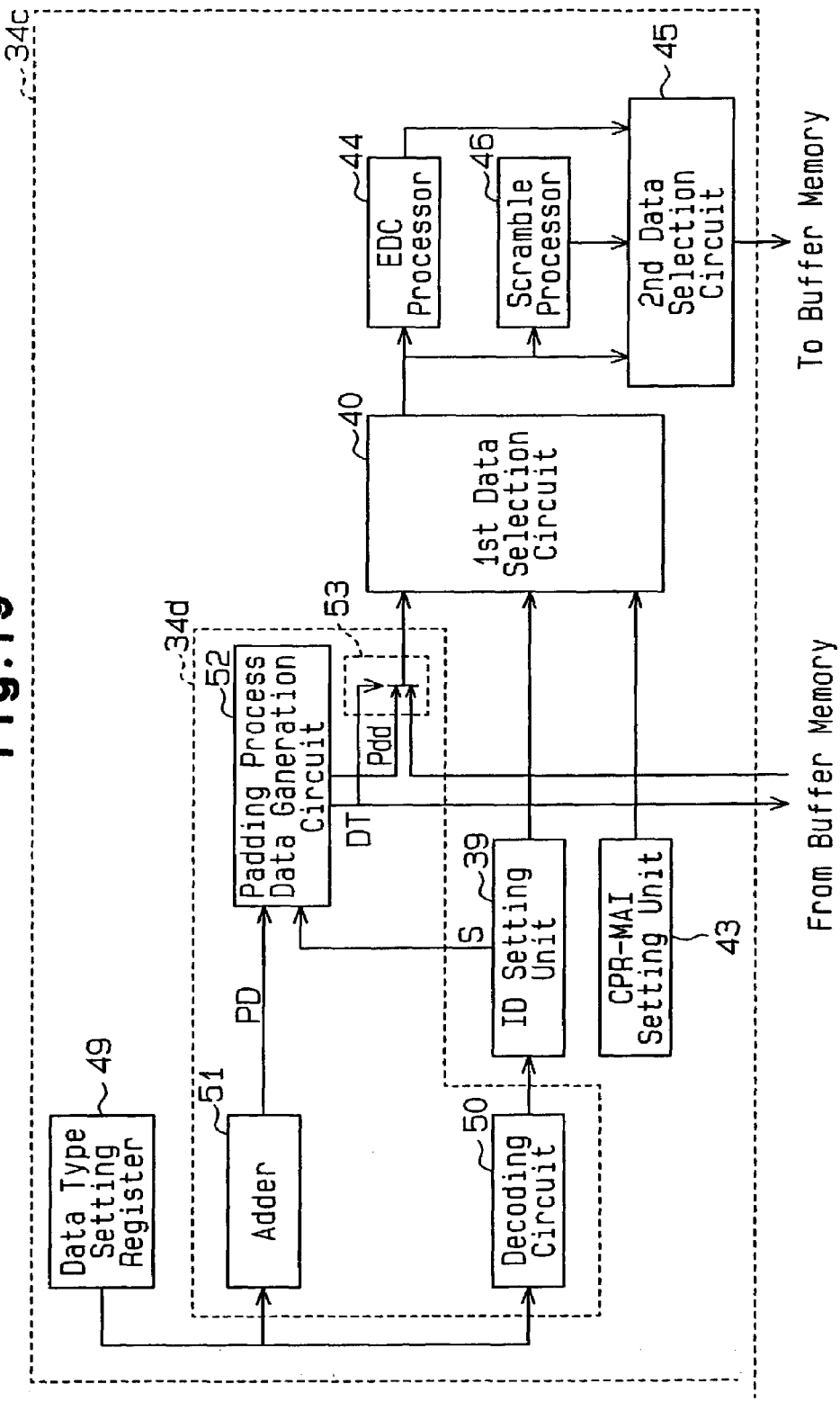
FIG. 19 is a schematic block diagram of a data writing apparatus according to a fourth embodiment of the present invention.

FIG. 19 is a schematic block diagram of an error corrector 32c according to a fourth embodiment of the present invention. The error corrector 32c includes a padding processing circuit 34d and a selector circuit 53. The padding processing circuit 34d includes a decoding circuit 50, an adder 51, a padding process data generation circuit 52, and a selector circuit 53.

The padding process data generation circuit 52 compares the PD value, which is provided from the adder 51, with the sector value S, which is provided from the ID setting unit 39, to determine whether the present sector is to undergo the padding process. When the padding process data generation circuit 52 determines that the present sector is to undergo the padding process, the padding process data generation circuit 52 generates padding process data pdd, which is "00h", and provides the padding process data pdd to the selector circuit 53.

Further, when the padding process data generation circuit 52 determines that the present sector is to undergo the padding process, the padding process data generation circuit 52 provides a padding process detection signal DT to the selector circuit 53 and a data reading circuit (not shown).

In response to the padding process detection signal DT, the data reading circuit stops reading sector data from the buffer memory 3. In response to the padding process detection signal DT, the selector circuit 53 provides the padding process data pdd, which is provided from the padding process data generation circuit 52, to the first data selection circuit 40.

In the fourth embodiment, for sectors other than the padding process subject, the sector data read from buffer memory 3 is provided to the first data selection circuit 40 via the selector circuit 53. As for the padding process subject, the padding process data pdd generated by the padding process data generation circuit 52 is provided to the first data selection circuit 40 via the selector circuit 53.

In the fourth embodiment, when the padding process is performed, the reading of data from the buffer memory 3 is stopped. This decreases power consumption.

Figure 20:
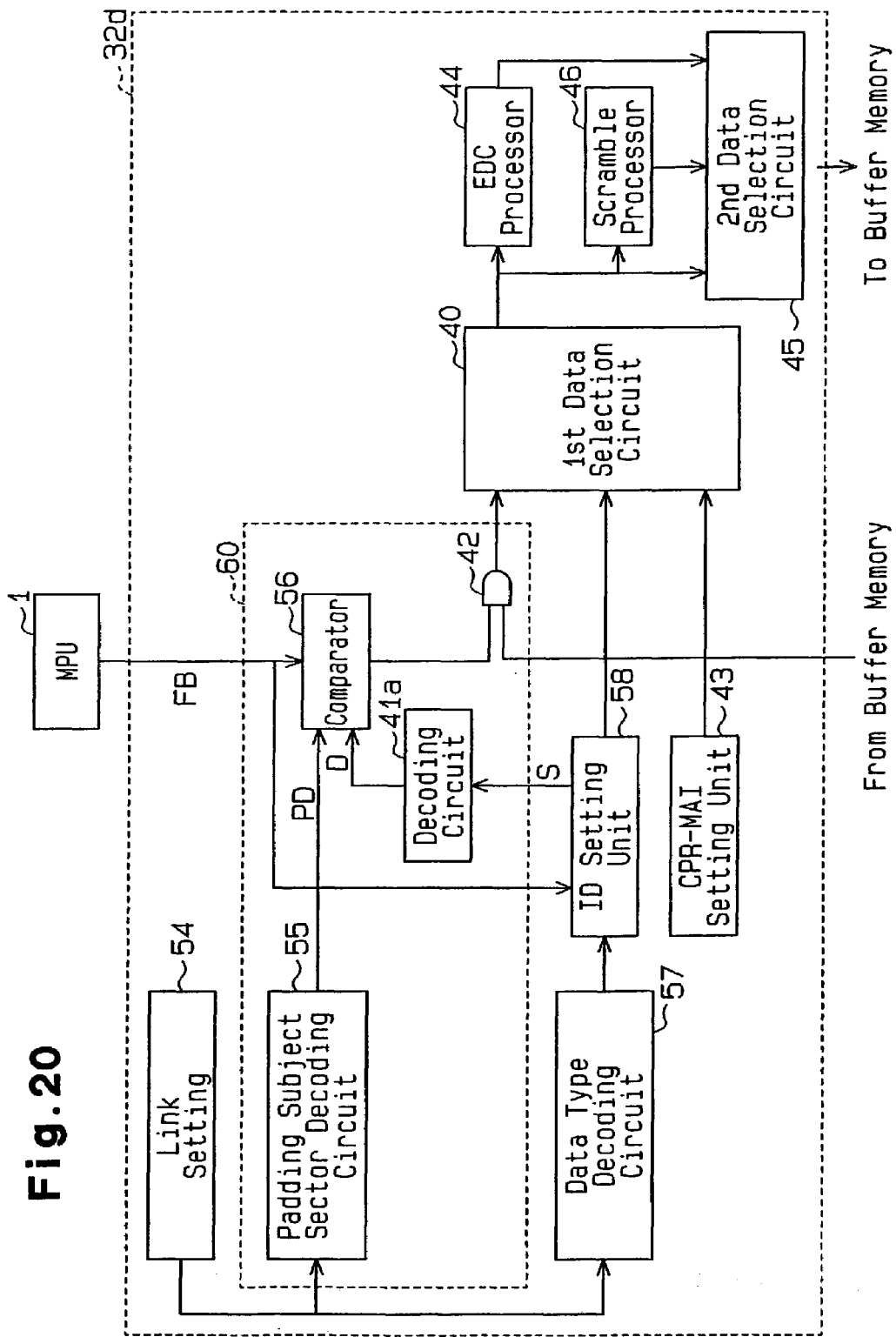
FIG. 20 is a schematic block diagram of a data writing apparatus according to a fifth embodiment of the present invention.

FIGS. 20 and 21 are schematic block diagrams of an error corrector 32 according to a fifth embodiment of the present invention. The error corrector 32*d* sets data type "1" to the 25th bit of each sector of the head block when writing is started. The error corrector 32*d* includes a Link setting unit 54, a padding process circuit 60, a data type decoding circuit 57, and an ID setting unit 58. The padding processing circuit 60 includes a decoding circuit 41*a*, an AND circuit 42, a padding subject sector decoding circuit 55, and a comparator 56.

Figure 7B:
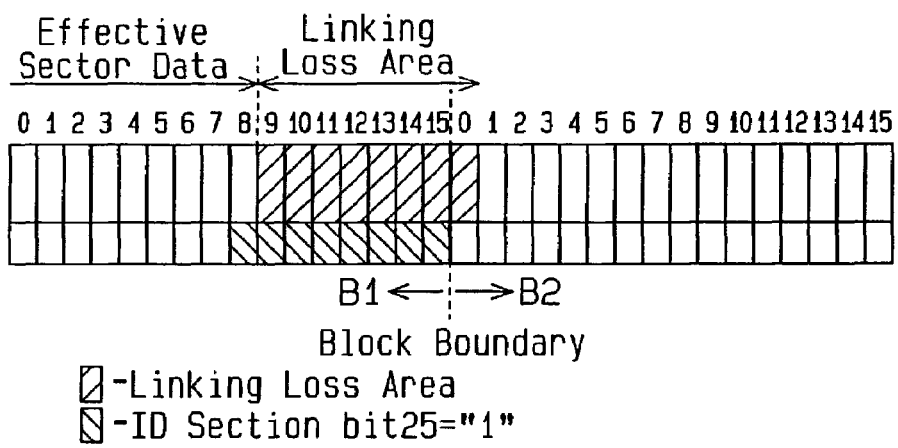
Figure 7C:
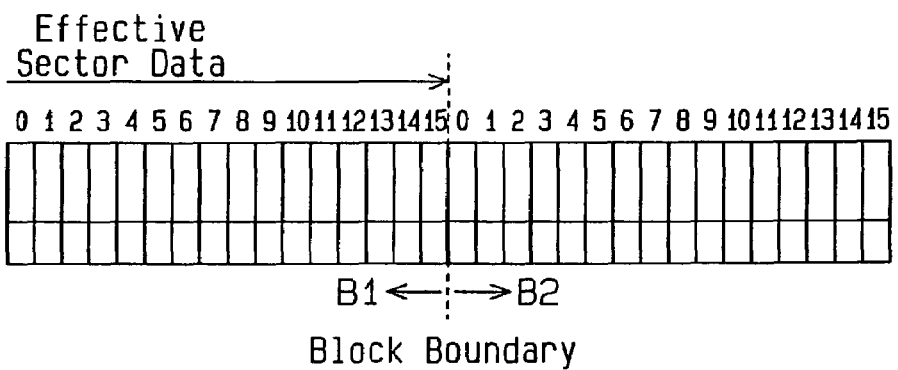
Figure 8:
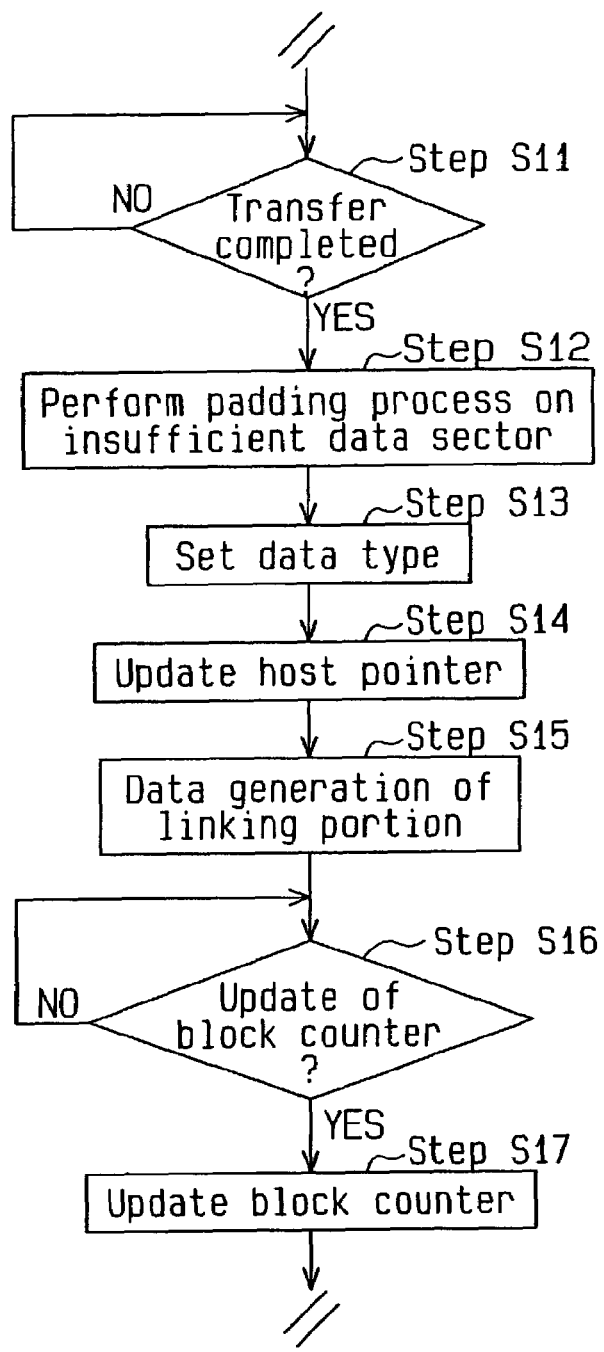
FIG. 8 is a flowchart illustrating a writing completion process performed by an MPU of the data writing apparatus shown in FIG. 1.
Figure 9:
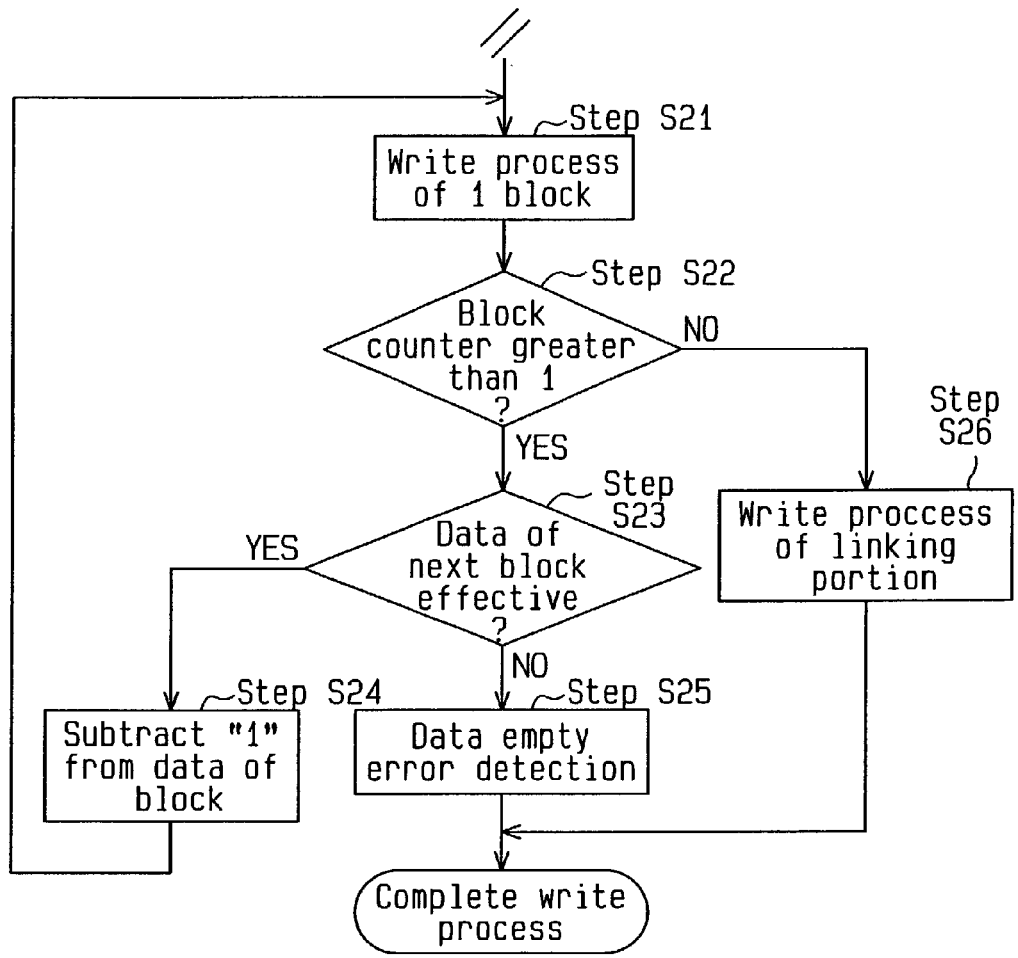
FIG. 9 is a flowchart illustrating a writing completion process performed by a formatter of the controller shown in FIG. 2.

In accordance with a signal from the MPU 1, the Link setting unit 54 sets linking loss area data, which indicates whether the linking loss area is a 32k-Link, as shown in FIG. 7(*a*), or a 2k-Link, as shown in FIG. 7(*b*).

The padding subject sector decoding circuit 55 receives linking loss area data from the Link setting unit 54 and uses the conversion table of FIG. 21(*a*) to generate a PD value, to which the bit associated with the padding subject sector is set to "1".

The padding process subject sector of the head block is determined in accordance with whether it is a 32k-Link or a 2k-Link. That is, the padding subject sector is automatically determined in accordance with a linking loss area data, which is automatically determined from the conversion table.

The data type decoding circuit 57 receives linking loss area data from the Link setting unit 54 and uses the conversion table of FIG. 21(*b*) to generate data type setting data. The data type setting data is configured from 16 bits that correspond to 16 sectors. The bit corresponding to the sector of which data type is to be set to "1" is set at "1".

The sector of which data type is to be set to "1" is determined in accordance with whether it is a 32k-Link or a 2k-Link. That is, sector of which data type is to be set to "1" is automatically determined in accordance with a linking loss area data, which is automatically determined from the conversion table.

The comparator 56 and the ID setting unit 58 receive a head block detection signal FB from the MPU 1 and operates in accordance with the head block detection signal FB.

In the fifth embodiment, when the writing process of the head block is performed, the ID setting unit 58 sets data type "1" to the 25th bit of the subject sector based on the data type setting data from the data type decoding circuit 57.

Further, the comparator 56 and the AND circuit 42 performs the padding process on the subject sector based on the PD value provided from the padding subject sector decoding circuit 55.

It should be apparent to those skilled in the art that the present invention may be embodied in many other specific forms without departing from the spirit or scope of the invention. Particularly, it should be understood that the present invention may be embodied in the following forms.

In the first to fourth embodiments, the formatter 33 may include the block counter 22 of FIG. 2. In this case, when the count value of the block counter is "1" and the write completion flag 35 is "1", the formatter 33 proceeds to the linking process.

In the third embodiment, the data type setting register 49 may store the sector value that starts the padding process. In this case, the conversion table is set so that the decoding circuit 50 sets the data type of the sector, which is just before the sector associated with the sector value stored in the data type setting register 49, to "1".

In the fifth embodiment, the padding process and the data type are set for only the head block by providing the comparator 56 and the ID setting unit 58 with the head block detection signal FB. However, the head block detection signal FB may be provided to the padding subject sector decoding circuit 55 and the data type decoding circuit 57. This invalidates the operation of the padding subject sector decoding circuit 55 and the data type decoding circuit 57 for blocks other than the head block.

The present invention may be embodied in a writing apparatus formed by combing one of the first to fourth embodiments with the fifth embodiment.

The present invention may be applied to a writing apparatus for a DVD-RW medium.

The present invention may be applied to a writing apparatus for a DVD+RW medium.

The usage of a data type bit in a DVD+RW medium differs from that of the DVD-R. Thus, the data type register cannot be used for a padding process in the DVD+RW medium. However, the present invention may be applied to the DVD-RW medium by adding the data type setting registers 36, 49 of the first to fourth embodiments as a padding process setting register.

Figure 22:
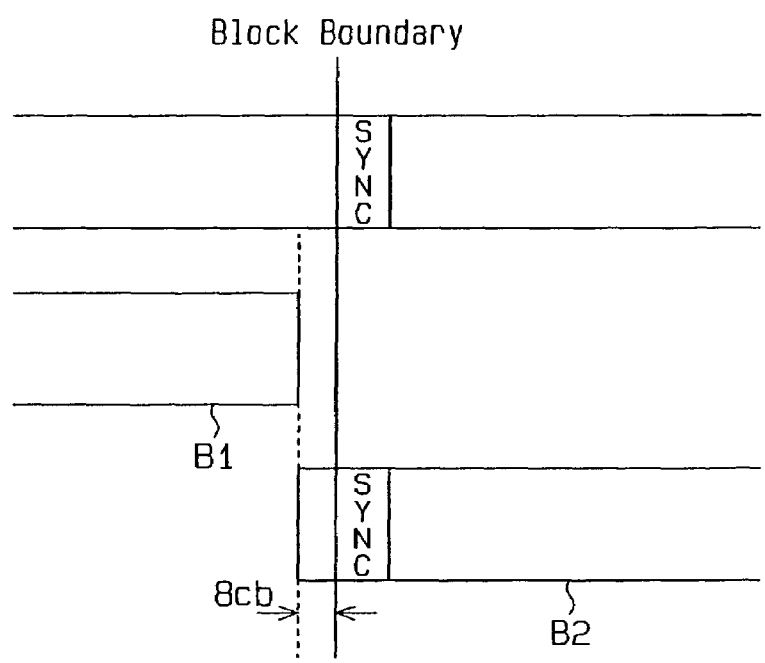
FIG. 22 is a diagram illustrating a modified data linking portion.

As shown in FIG. 22, in the DVD+RW, the writing of a linking portion is started 8 channel bits (cb) earlier in the head block B2 and completed 8cb earlier in the final block B1.

When the writing of data is started, 8cb of dummy data is written. Thus, write data does not have to be stored in the buffer memory, and the MPU does not have to control the writing of the linking portion.

Figure 23:
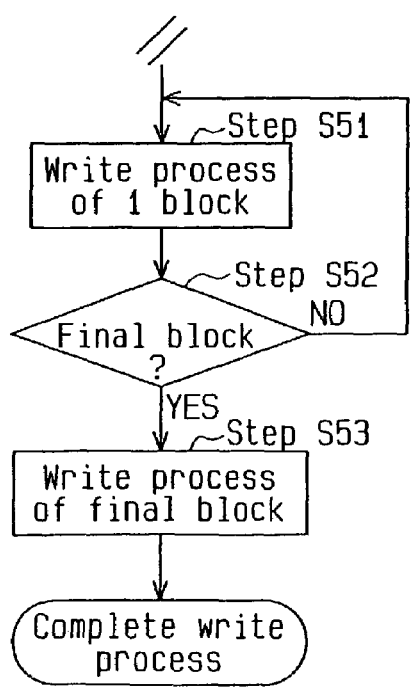
FIG. 23 is a flowchart illustrating a further process performed by the formatter.

The formatter 33 performs the writing process on the final block B1 as shown in FIG. 23. That is, when the writing process is performed in block by block manner, before starting the writing of each block, it is determined from a flag whether or not the write subject block is the final block (steps S51 and S52). When the write subject block is the final block, the write process is completed 8cb earlier (step S53).

The formatter 33 may include a block counter. When a count value indicating the remaining number of processing blocks of the block counter is 0, the formatter 33 detects an error when the detection flag of the final block is not 1.

Further, prior to the writing process of each block, the formatter 33 may compare the error correction pointer 11 of the error corrector with the disc control pointer 21 of the formatter 33 to determine the occurrence of a data empty state.

In the DVD+RW, the MPU does not have to control the writing of the linking portion. Thus, in the write completion process of the MPU 1 that is shown in FIG. 14, the process of step S44 (i.e., the data generation of the linking portion) is eliminated.

The present invention may be applied to a new medium that uses the DVD data format. In this case, if the EDC is also calculated, the padding process of "00h" is also performed on the insufficient data sectors of the final block in the same manner as a DVD-R.

The present examples and embodiments are to be considered as illustrative and not restrictive, and the invention is not to be limited to the details given herein, but may be modified within the scope and equivalence of the appended claims.

What is claimed is:

1. An apparatus for writing block data, which includes a plurality of sectors, to a recording medium, the apparatus comprising:
   a controller for generating the block data and writing the block data to the recording medium, wherein the controller performs a padding process on final block data when the final block data is written to the recording medium; and
   a processing unit for controlling the controller, wherein the controller includes an error corrector that generates the block data, and wherein the error corrector includes a padding processing circuit for generating padding process data padded in the final block data.

2. The apparatus according to claim 1, wherein the block data is DVD format data.

3. The apparatus according to claim 1, further comprising a buffer memory for storing the block data, wherein the controller includes:
   a host interface connected to the buffer memory to receive user data and store the user data in the buffer memory; and
   a formatter for writing the block data to the recording medium, wherein the error corrector generates the block data using the user data read from the buffer memory and stores the block data in the buffer memory.

4. The apparatus according to claim 3, wherein each of the sectors includes an identification data section, and wherein the error corrector includes a data type setting unit for setting a data type to the identification data section of each sector of a final block.

5. The apparatus according to claim 4, wherein the formatter adds a linking portion to a terminal end of the final block data when writing the final block data to the recording medium, and wherein the error corrector sets a write completion flag after generation of the final block data, the formatter writing the linking portion to the recording medium in accordance with the write completion flag after completion of the writing of the final block data.

6. The apparatus according to claim 3, wherein the formatter adds a linking portion to a terminal end of the final block data when writing the final block data to the recording medium, and wherein the error corrector sets a write completion flag after generation of the final block data, the formatter writing the linking portion to the recording medium in accordance with the write completion flag after completion of the writing of the final block data.

7. The apparatus according to claim 3, wherein the error corrector includes a data type setting register for storing data type setting data of the final block data, wherein the padding processing circuit includes:
   a detector connected to the data type setting register to generate a detection signal of a padding process subject sector in the final block in accordance with the data type setting data; and
   a padding process data generation unit connected to the detector to generate padding process data in accordance with the detection signal.

8. The apparatus according to claim 7, wherein the data type setting register stores the data type setting data, which is bit data corresponding to the sectors of the final block data, and wherein the detector generates the detection signal by performing an AND logic operation of adjacent bit data.

9. The apparatus according to claim 7, wherein the detector includes a decoding circuit for generating the detection signal of a head sector that is the padding process subject on the basis of the data type setting data stored in the data type setting register.

10. The apparatus according to claim 7, wherein, among the plurality of sectors of the final block data, the data type setting register stores the value of a head sector to which the data type is required to be set, and wherein the detector includes an adder connected to the data type setting register to generate the detection signal of the head sector that is the padding process subject by adding "1" to the value of the head sector.

11. The apparatus according to claim 7, wherein the padding process data generation unit includes a selection circuit for selecting the padding process data in lieu of the user data stored in the buffer memory in accordance with the detection signal of the detector.

12. An apparatus for writing block data, which includes a plurality of sectors, to a recording medium, wherein each sector includes an identification data section, the apparatus comprising:
   a controller for generating the block data and writing the block data to the recording medium, wherein the controller performs a padding process on final block data when the final block data is written to the recording medium; and
   a processing unit for controlling the controller, wherein the controller includes;
      an error corrector that generates the block data, and wherein the error corrector includes a padding processing circuit for generating padding process data padded in the final block data; and
      a data type setting unit for setting a data type to the identification data section of each sector of the final block.

13. The apparatus according to claim 12, wherein the block data is DVD format data.

14. The apparatus according to claim 12, wherein a linking portion is added to a terminal end of the final block data; and
   wherein the controller further includes a generation circuit for generating part of the linking portion.

15. The apparatus according to claim 14, wherein the controller includes a formatter for writing the block data to the recording medium, and wherein the controller sets a write completion flag when the generation of the final block data is completed, and wherein the formatter writes the linking portion to the recording medium when the formatter sets the write completion flag.

16. An apparatus to store user data to a recording medium divided in sectors, the apparatus comprising:
- a multi-processing unit to control a data writing process; and
- a controller to perform the data writing process, the controller including an error corrector to convert user data into block data, and having a padding process circuit to generate padding process data used in a padding process performed on final block data of the converted user data wherein the padding process data is padded in the final block data.

* * * * *